United States Patent [19]

Johnson

[11] 4,234,203
[45] Nov. 18, 1980

[54] BERRY PICKERS WAGON

[76] Inventor: Alvin P. Johnson, 617 S. Arthur, Box 123, New Harmony, Ind. 47631

[21] Appl. No.: 24,165

[22] Filed: Mar. 26, 1979

[51] Int. Cl.³ .......................................... A01D 67/04
[52] U.S. Cl. .................................................. 280/32.5
[58] Field of Search ........... 280/32.5, 87.01, 87.02 R, 280/47.34, 47.35, 47.38, 47.11, 47.19, 79.2, 47.36, 47.37 R; 56/39, 191, 201, 330; 55/93

[56] References Cited

U.S. PATENT DOCUMENTS

| | | | |
|---|---|---|---|
| 1,745,562 | 2/1930 | Taicher | 280/32.5 |
| 1,912,040 | 5/1933 | Putnam | 280/87.01 |
| 2,317,606 | 4/1943 | Harris | 280/32.5 |
| 2,704,158 | 3/1955 | Long | 280/32.5 |
| 3,430,982 | 3/1969 | Despain | 280/32.5 |

Primary Examiner—John J. Love
Assistant Examiner—Randall A. Schrecengost
Attorney, Agent, or Firm—Warren D. Flackbert

[57] ABSTRACT

A wagon having particular adaptability for use in the picking of fruits of cultivated berry plants, such as strawberries, or other short growing crops, which, when positioned, overlies a preselected row of plants and which is propelled by the feet of the seated picker in a direction opposite to that which the picker is facing. Provision is made for directing the wagon in a proper direction along the aforesaid plant row, and storage areas on the wagon afford ready placement of the picked fruit. The wagon may be equally pushed for use, as stated, and/or pulled to a desired location.

5 Claims, 5 Drawing Figures

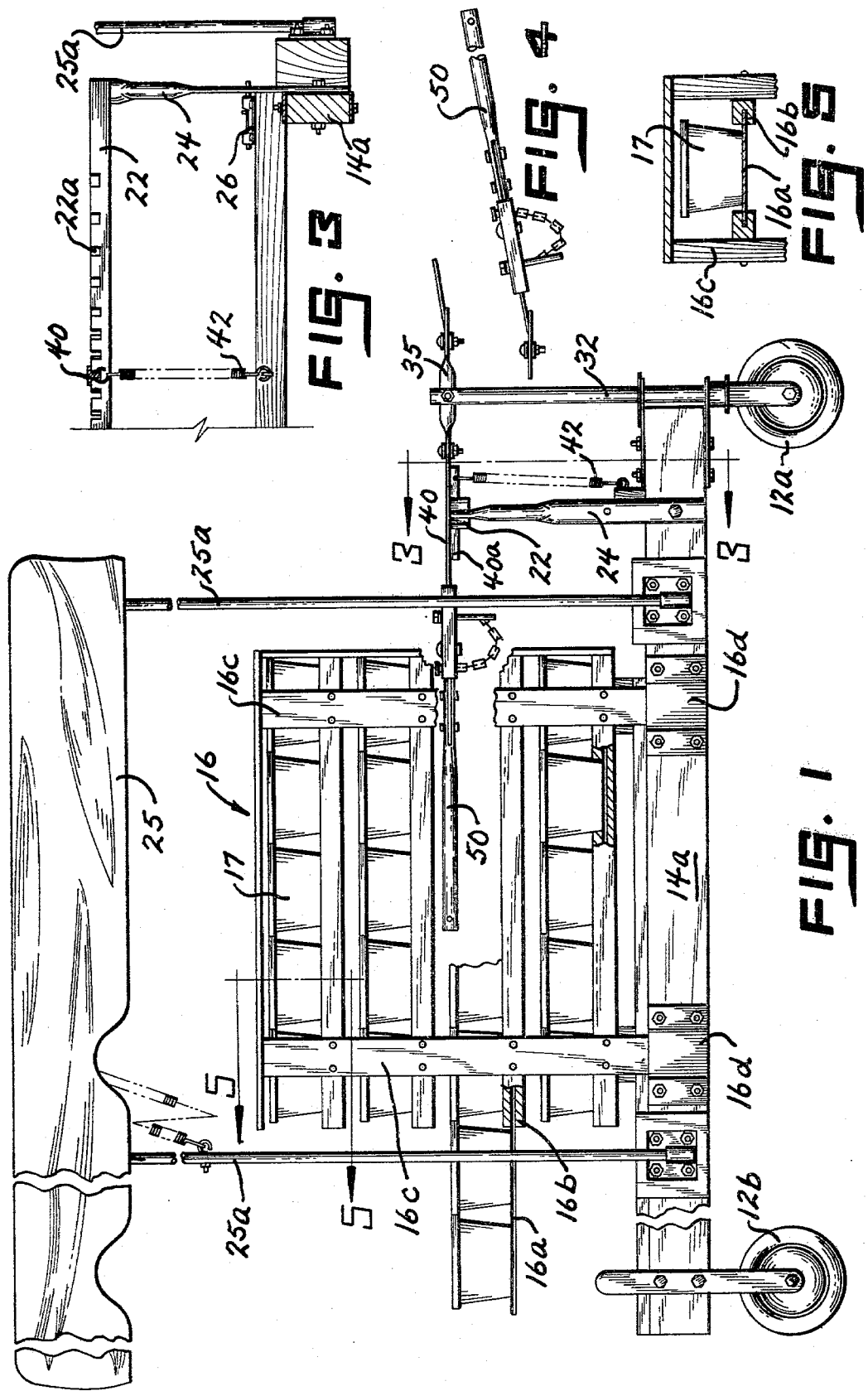

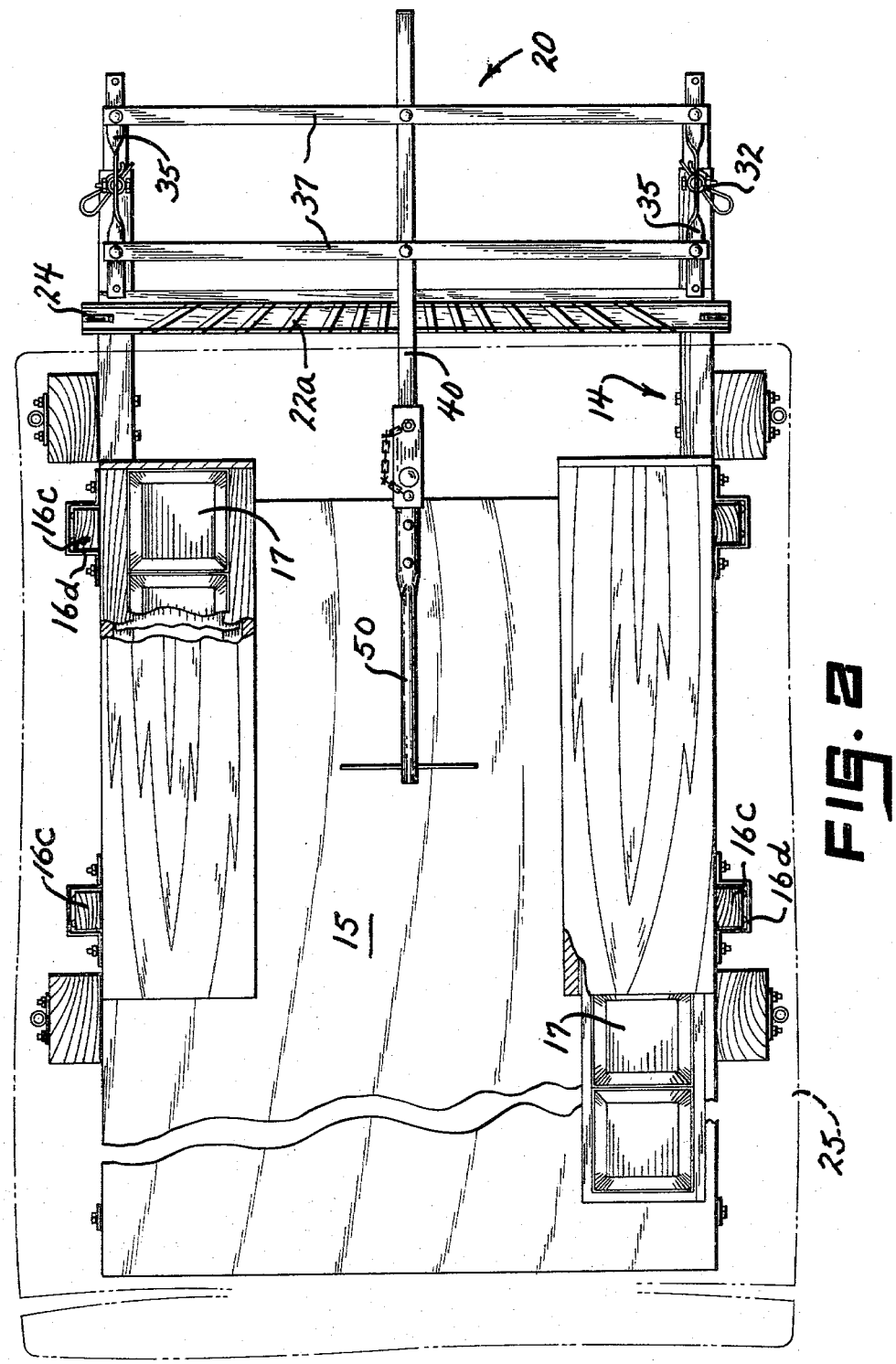

BERRY PICKERS WAGON

As is known, the hand picking of fruit bearing plants, such as strawberries, for example, is time consuming and represents considerable bending, and oftentimes physical strain, on the part of the individual. The preceding limits the amount of product which can be effectively picked in a given period of time, serving to reflect on end cost to the consumer. Cultivated strawberry plants are typically arranged in rows, where the aforesaid picker mostly proceeds on a row to row basis, generally placing the harvested fruit in boxes or containers which are then carried to a deposit or pickup area.

The preceding picking procedure does, therefore, present difficulties and the invention serves to overcome such by providing a wagon or vehicle for seating the picker close to the crop and also for receiving and temporarily storing the harvested food product. More particularly, the instant wagon moves in an overlying relationship with respect to a cultivated row of plants awaiting harvesting, such movement being achieved through pushing action by the picker's feet.

In other words, the picker, who faces rearwardly of the direction of movement of the wagon, accomplishes movement by digging feet into the soil adjoining the plant row, either on both sides or on one side. A steering arrangement or select guide is provided to assure the proper movement of the wagon, where a portion thereof serves to selectively lock such movement in a desired direction.

The wagon of the invention permits picking ease because of the overlying or straddling relationship with the plant row. In other words, the picker's hands are in the immediate area of the fruit or crop due to being seated on the wagon. Moreover, the invention permits the ready harvesting of each row of berry plants without undue body strain and with the convenience of an immediate storage area for the crop containing boxes.

In order to provide even more added comfort, weather/sun shielding means, such as canvas roofing material, may be employed. A further feature is the dual purpose guiding handle of the select guide for the wagon, i.e. one which may be used not only for steering purposes during pushing for crop picking, but, also, for pulling the wagon to any desired location.

In any event, a better understanding of the present invention will become more apparent from the following description, taken in conjunction with the accompanying drawings, wherein FIG. 1 is a view in side elevation showing a berry pickers wagon in accordance with the teachings of the invention;

FIG. 2 is a top plan view of the wagon of FIG. 1, being partly broken away to present a fuller understanding of the structure;

FIG. 3 is a view in front elevation of a portion of the steering arrangement, taken at line 3—3 on FIG. 1 and looking in the direction of the arrows;

FIG. 4 is a view in side elevation showing the guiding handle forming part of the steering arrangement when used for pulling purposes; and, FIG. 5 is a view in elevation, partly in section, showing one type of rack for receiving the boxes of picked crop, taken at line 5—5 on FIG. 1 and looking in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the berry picking wagon of the invention is defined by front wheels 12a and rear wheels 12b mounting a framework 14, the latter including side rails 14a which serve to support a platform 15. The crop picker is seated on the rear portion of platform 15, i.e. at the left end of the wagon in FIGS. 1 and 2.

As will be more fully discussed herebelow, the wagon has a steering or select guide assembly 20, rack arrangements 16 for receiving and storing crop filled boxes 17, and for purposes of comfort, a weather/sun shade 25, typically canvas or the like, mounted on a framework (not shown) supported by upstanding members 25a secured to the side rails 14a.

The aforementioned container storage arrangements 16 are positioned, typically, rearwardly of the seated position of the picker on the platform 15 along and above the side rails 14a (see FIG. 2). As particularly evident in FIGS. 1, 2 and 5, the individual boxes 17 for the picked fruit or crop are received on shelves 16a slidably mounted on grooved supports 16b secured to upstanding members 16c, where the outer upstanding members 16c are releasably positioned by a means of brackets 16d on the side rails 14a.

The preceding components act in a unitary fashion, i.e. the storage racks 16 containing the crop filled boxes 17 are easily removed from the wagon for transporting to a processing area. As further evident in FIGS. 1 and 2, the shelves 16a are slidable in the grooved supports 16b, affording ready access to the boxes 17 and the contents thereof.

The steering or select guide arrangement or mechanism 20 afforded by the invention permits positive directional movement of the wagon during the crop picking procedure. In this connection, a bar 22 mounted on upstanding members 24 secured to side rails 14a is defined by a plurality of grooves 22a, angularly disposed with respect to each other from a mid or center position in a fanlike pattern. The bar 22 is pivotal in a forward direction, for example, for reasons which will be understood from the discussion herebelow, where conventional slide catches 26 are provided to selectively retain the upstanding members 24 in a vertical position.

Again with reference to FIGS. 1 and 2, the front wheels 12a of the wagon depend from rotatable posts 32 and, accordingly, are movable within an angular range of positions for directional purposes. In one arrangement, each post 32 is slitted at the top to receive a side member 35 which is bolted thereto. Interconnecting members 37 join the side members 35 to define a parallelogram (see FIG. 2). A guiding shaft or handle 40 is secured to the midpoint of each interconnecting member 37, so that, when angularly displaced for use, the parallelogram relationship is maintained and each of the front wheels 12a moves with the other front wheel. In other words, positive directional movement is achieved through the simultaneous movement of each of the front wheels 12a.

In order to lock the wheel direction at a desired position, a projection 40a on the undersurface of the guiding handle 40 is selectively placed in one of the grooves 22a on the bar 22. As evident in FIG. 3, spring means 42 continually urge the guiding handle 40 in a downward locking direction. Restated, and when used, the guiding handle 40 is lifted and then lowered into any desired groove 22a, meaning that the front wheels 12a are both directionally coupled for the desired path of travel.

To provide further versatility to the wagon of the invention, an extension 50 is releasably secured to the guiding handle 40, the extension 50 serving to provide ready grasping by the seated picker, i.e. use without the necessity of leaving the wagon and making a directional change. If it is desired to pull the wagon to a given location, the extension 50 is releasably secured to the opposite end of the guiding handle 40 (see FIG. 4). In this connection, when pulling is to be accomplished, the bar 22 is lowered by releasing the slide catches 26 and pivoting the upstanding members 24 forwardly. In other words, the lowering of the bar 22 serves to eliminate any possible locking action when pulling the wagon.

Accordingly, and in view of the preceding discussion, it should be evident that the pickers wagon of the invention serves effective use in harvesting a low growing crop. In this connection, in that the picker is seated immediately proximate the level of the plants, ready harvesting is accomplished without undue bending. Moreover, and noting that the wagon straddles a plant row and, further, that no axle is employed for the supporting wheels 12a and 12b, unobstructed movement is afforded over the plants.

Additionally, the steering arrangement 20 provides ease for the seated picker in accommodating any unwanted or drifting movement during the picking procedure. In other words, if the picker realizes that the wagon is straying from the desired picking path, the guiding handle 40 may be readily pivoted, changing the front wheel direction, and correcting the travel. On the other hand, the extension 50 to the guiding handle 40 also permits the ready pulling of the wagon to any desired site.

Moreover, the typical storage rack arrangement 16 described above further simplifies the picking of a crop, in that the operator can just turn slightly around and place the filled boxes or containers 17 on the shelves 16a, where, subsequently, each rack assembly 16 can be removed from the framework 14 of the wagon for the next processing step.

The berry or crop pickers wagon described hereabove is susceptible to various changes within the spirit of the invention as, for example, in proportioning; the particular steering arrangement employed; the configuration of the desired storage racks; and, the like. Thus, the preceding description should be considered illustrative and not as limiting the scope of the following claims:

I claim:

1. A crop pickers wagon which straddles a row of crops comprising front wheels and rear wheels mounting a framework supporting a platform for seating a picker at the rear end thereof and affording unrestricted crop access, a steering arrangement disposed at the opposite end of said platform behind said picker and operable by said picker in a seated position, and means forming part of said steering arrangement selectively guiding movement of the wagon in a preselected direction, said guiding means defined by a framework mounted bar having a plurality of notches therein, a centrally disposed pivotal handle controlling movement of a parallelogram shaped operating framework for said front wheels, the latter simultaneously responding to movement of opposite sides of said operating framework, and resilient means selectively positioning said pivotal handle in one of said notches in said bar and locking the direction of said front wheels and wagon movement, where foot action by the picker with the supporting ground propels the wagon in said preselected direction of said steering arrangement and opposite to the direction said picker faces.

2. The crop pickers wagon of claim 1 where an extension is provided which is reversibly and detachably secured to said pivotal handle for selective pushing and pulling movement of said wagon.

3. The crop pickers wagon of claim 1 where said platform includes racks for receiving crop receiving receptacles.

4. The crop pickers wagon of claim 3 where said racks are releasably mounted on said framework.

5. The crop pickers wagon of claim 1 where said framework supports a weather shield over the picker.

* * * * *